United States Patent [19]

Bane

[11] 4,063,366
[45] Dec. 20, 1977

[54] GRADE LEVEL

[76] Inventor: Phillip A. Bane, R.R. No. 2, Oakland, Iowa 51560

[21] Appl. No.: 691,823

[22] Filed: June 1, 1976

[51] Int. Cl.$^2$ .............................................. G01C 9/12
[52] U.S. Cl. ...................................... 33/396; 33/346; 33/366
[58] Field of Search ................. 33/366, 396, 402, 365, 33/378, 391, 346

[56] References Cited

U.S. PATENT DOCUMENTS

| 1,855,664 | 4/1932 | Budge | 33/396 |
| 2,280,726 | 4/1942 | Sperry | 33/346 |
| 2,924,022 | 2/1960 | Callahan | 33/346 |
| 3,945,391 | 3/1976 | Pearse | 33/396 |

FOREIGN PATENT DOCUMENTS

| 13,710 | 4/1911 | France | 33/346 |
| 251,921 | 5/1926 | United Kingdom | 33/346 |
| 425,713 | 3/1935 | United Kingdom | 33/346 |

Primary Examiner—Charles E. Phillips
Attorney, Agent, or Firm—Zarley, McKee, Thomte, Voorhees & Sease

[57] ABSTRACT

A grade level comprising a hollow, fluid-tight cylindrical housing having its central axis normally disposed in a horizontal attitude. The housing comprises an annular wall portion and spaced-apart end members mounted on opposite sides thereof. A horizontally disposed shaft is mounted in the housing and extends between the end members and has a float-weight mechanism operatively rotatively mounted thereon. The mechanism comprises a float portion which extends upwardly from the shaft and a counterbalacing weight which extends downwardly from the shaft. A pair of baffles are secured to the annular wall portion at opposite sides thereof and extend substantially horizontally inwardly therefrom towards the shaft. A fluid is provided within the housing to dampen the movement of the mechanism as the housing is moved to various attitudes. A ballast material is provided in the weight portion to cause the mechanism to normally be positioned in an upright positive relative to horizontal. A sensing apparatus is provided on the housing adjacent the upper end of the float portion for sensing the movement of the mechanism relative to the housing. A read-out mechanism is operatively connected to the sensing apparatus to enable the operator to determine the grade.

1 Claim, 7 Drawing Figures

GRADE LEVEL

BACKGROUND OF THE INVENTION

This invention relates to a grade level and more particularly to the type of grade level which may be used on farm vehicles or the like for use in establishing contour lines during farming operations.

Many types of contour or grade levels have been previously devised but all of the previous devices suffer one or more shortcomings. Certain of the existing devices are not responsive to minute changes in grade and such a characteristic makes it practically impossible to establish or maintain proper grade or contour levels. Additionally, certain of the existing contour or grade levels "over-react" to changes in the level of the carrier vehicle and such "over-reaction" results in inaccurate grade level indications.

Therefore, it is a principal object of the invention to provide an improved contour or grade level.

A still further object of the invention is to provide a grade level having means thereon for retarding or dampening the pivotal movement of the mechanism provided therein.

A still further object of the invention is to provide a grade level comprising a pivotal combination of a weight and float immersed in a liquid.

A still further object of the invention is to provide an improved grade level which does not "over-react" to changes in grade.

A still further object of the invention is to provide a grade level which is extremely accurate.

A still further object of the invention is to provide a grade level which is economical to manufacture and durable in use.

These and other objects will be apparent to those skilled in the art.

DESCRIPTION OF THE PREFERRED EMBODIMENT

Figure 1:
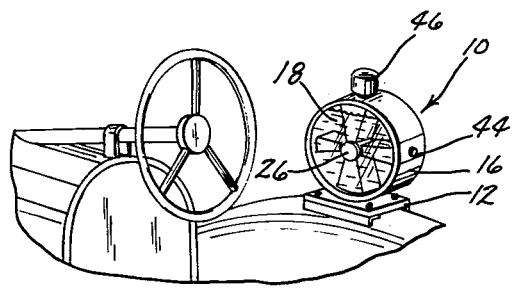
FIG. 1 is a partial perspective view illustrating the device of this invention mounted on a tractor.
Figure 2:
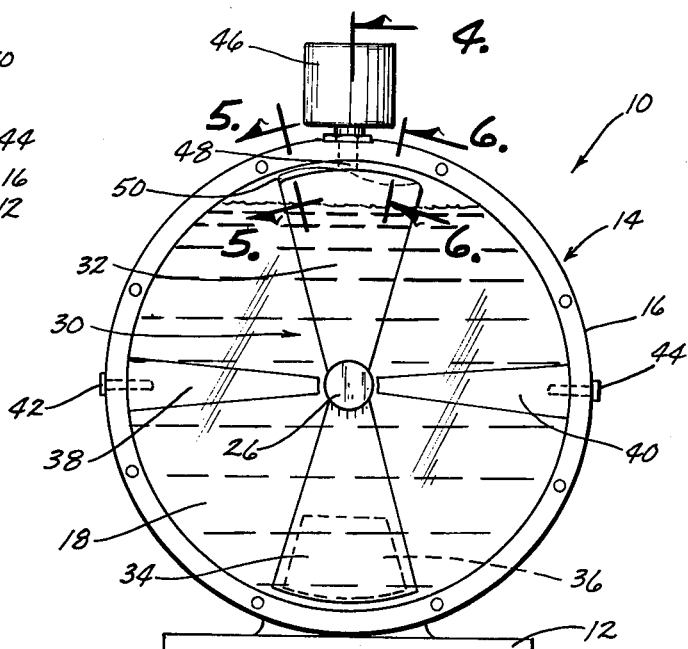
FIG. 2 is a front elevational view of the device.
Figure 3:
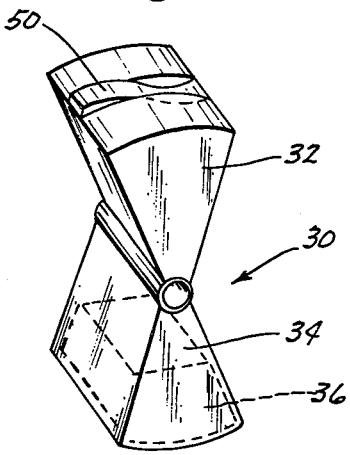
FIG. 3 is a perspective view of the mechanism.
Figure 5:
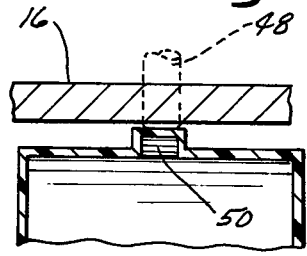
FIG. 5 is a sectional view as seen on lines 5—5 of FIG. 2.
Figure 6:
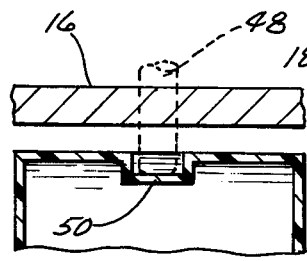
FIG. 6 is a sectional view as seen on lines 6—6 of FIG. 2.
Figure 4:
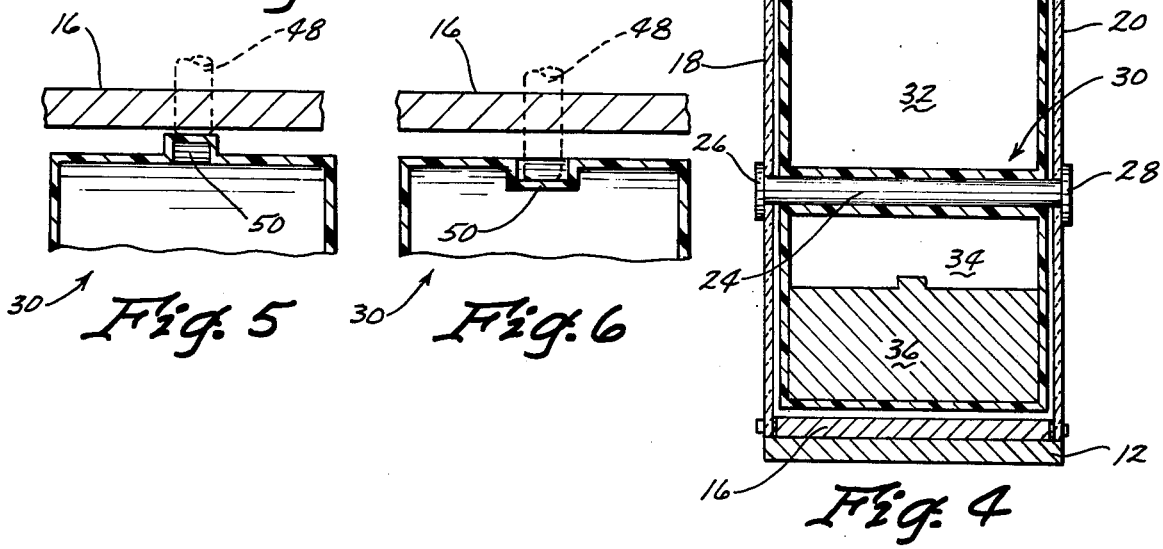
FIG. 4 is a sectional view as seen on lines 4—4 of FIG. 2.

The grade level of this invention is referred to generally by the reference numeral 10 and generally comprises a base 12 having a cylindrical housing 14 mounted thereon. Housing 14 generally comprises an annular wall 16 having spaced-apart end walls 18 and 20 secured thereto by screws 22.

Walls 18 and 20 are provided with a centrally disposed opening formed therein which receives the opposite ends of a shaft 24. Seal caps 26 and 28 are secured to exterior surfaces of walls 18 and 20 outwardly of the ends of the shaft 24 to prevent the escape of fluid from the interior of the housing. The numeral 30 refers generally to a float and weight combination which is rotatably mounted on shaft 24 and which includes a float portion and a counterbalancing weight 34. As seen in the drawings, elements 32 and 34 are generally "pie" shaped and are provided with hollow interiors. The interior of float portion 32 is filled with air while the interior of weight 34 is filled with a ballast material referred to generally by the reference numeral 36. The ballast material 36 may be comprised of lead or other suitable metal material. A pair of wedge-shaped baffles 38 and 40 are secured to the interior wall surface of wall 16 by screws 42 and 44 respectively and extend inwardly therefrom towards shaft 24. As seen in the drawings, the inner ends of baffles 38 and 40 terminate closely adjacent the shaft 24 but a small space is provided therebetween to permit the passage of fluid therebetween as will be described in more detail hereinafter. The interior of the housing is substantially filled with oil or other suitable fluid except for a small space at the upper end thereof.

The device is mounted on a suitable vehicle such as a tractor or the like and would be mounted so that the axis of shaft 24 is disposed transversely to the direction of travel of the tractor. As the forward end of the tractor moves upwardly or downwardly relative to horizontal, the apparatus 10 will also move in the same direction. However, float and counterbalancing weight 30 tends to remain in the upright or vertically disposed position due to the ballast material 36 so that relative movement is experienced between float and weight 30 and the housing 14. As housing 14 moves with respect to float and weight 30, the oil or fluid within the housing tends to retard or dampen the movement thereof so that the float and weight will not "over-react" to the movement. The width of the elements 32 and 34 is slightly less than the distance between the end walls 18 and 20 so that a small amount of fluid may pass therebetween as the elements pivotally move with respect to the housing. Likewise, the fluid may pass between the inner ends of the baffles 38 and 40 and shaft 24. The baffles 38 and 40 serve to retard or baffle the movement of fluid within the housing.

The drawings illustrate one means by which the movement of the float and weight 30 is sensed to indicate to the vehicle operator the grade that the vehicle is traversing. In the drawings, the numeral 46 refers to a conventional linear variable differential transformer (LVDT) having a core 48 extending downwardly through the upper end of the housing 14 as seen in the drawings. The lower end of core 48 rides upon the cam surface provided on the upper end of float portion 32 which is referred to generally by the reference numeral 50. Cam surface is provided with a high and low portion on opposite sides of the center line thereof so that pivotal movement of the float in one direction will cause the core 48 to move downwardly with respect to the coil of the LVDT 46 so that the core 48 will move upwardly relative to LVDT 46 when the float moves in the opposite direction.

Figure 7:
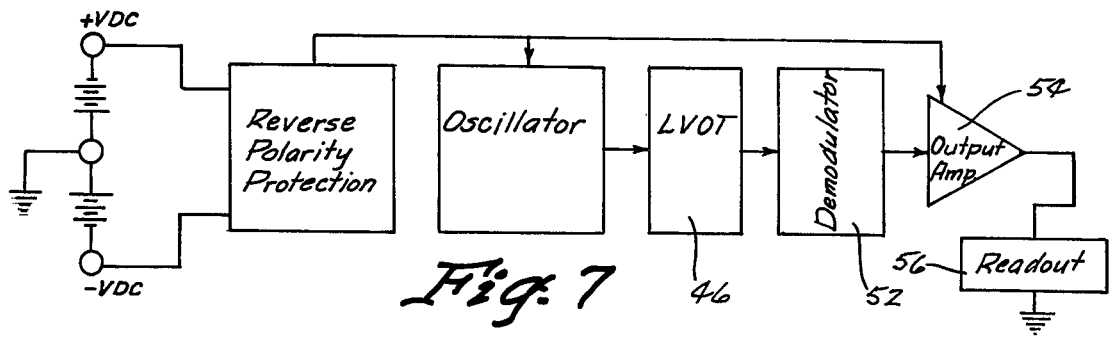
FIG. 7 is a schematic of the electrical circuitry of the invention.

FIG. 7 illustrates a typical circuit when an LVDT is being employed. As seen in FIG. 7, the LVDT 46 provides a signal to the modulator 52 which is coupled to the output amplifier 54 which supplies a signal to a read-out apparatus referred to generally by the reference numeral 56. The read-out apparatus 56 may be comprised of either a pair of lights which would indicate whether the vehicle was moving upwardly or downwardly relative to horizontal or could be comprised of a movable needle or the like.

Thus it can be seen that a novel grade level has been provided which enables an operator to visually determine whether the vehicle is moving upwardly or downwardly relative to horizontal so that he may establish contour or grade levels. The apparatus of this invention provides a very accurate indication of the grade and the fluid dampening means provided in the apparatus prevents the apparatus from "over-reacting" to movement of the vehicle. The fact that the float portion 32 is counterbalanced by weight 34 also enhances the ability of the device to effectively dampen the mechanism to a quick accurate reading. If desired, the sensing mechanism could be placed at the bottom to sense the movement of the weight 34. However, the preferred embodiment is that which is shown in the drawings. Thus it can be seen that the grade level of this invention accomplishes at least all of its stated objectives.

I claim:

1. A grade level comprising, a hollow, fluid-tight cylindrical housing having its central axis disposed in a horizontal attitude, said housing comprising an annular wall portion and end members mounted on opposite sides of said wall portion, a horizontally disposed shaft centrally mounted in said housing and extending between said end members, a float-weight combination operatively rotatably mounted on said shaft, a fluid in said housing substantially filling the interior thereof, said float-weight having a width substantially equal to the distance between said end members, means for causing said float-weight to normally be positioned in an upright position relative to the shaft axis, sensing means for sensing the position of said float-weight relative to said housing, and visual read-out means operatively connected to said sensing means for indicating the attitude of said housing and support means relative to horizitonal, said float-weight comprising a float portion extending upwardly from said shaft and a couterbalancing weight extending downwardly from said shaft, said sensing means comprising a cam surface on the upper end of said float portion, a linear variable differential transformer on the upper end of said housing and having a core in engagement with said cam surface, and electrical circuit means connecting said transformer to said read-out means.

* * * * *